June 25, 1968  J. H. BRUMFIELD  3,389,937
WHEEL COVER AND RETAINING MEANS THEREFOR
Filed Aug. 8, 1966  3 Sheets-Sheet 1
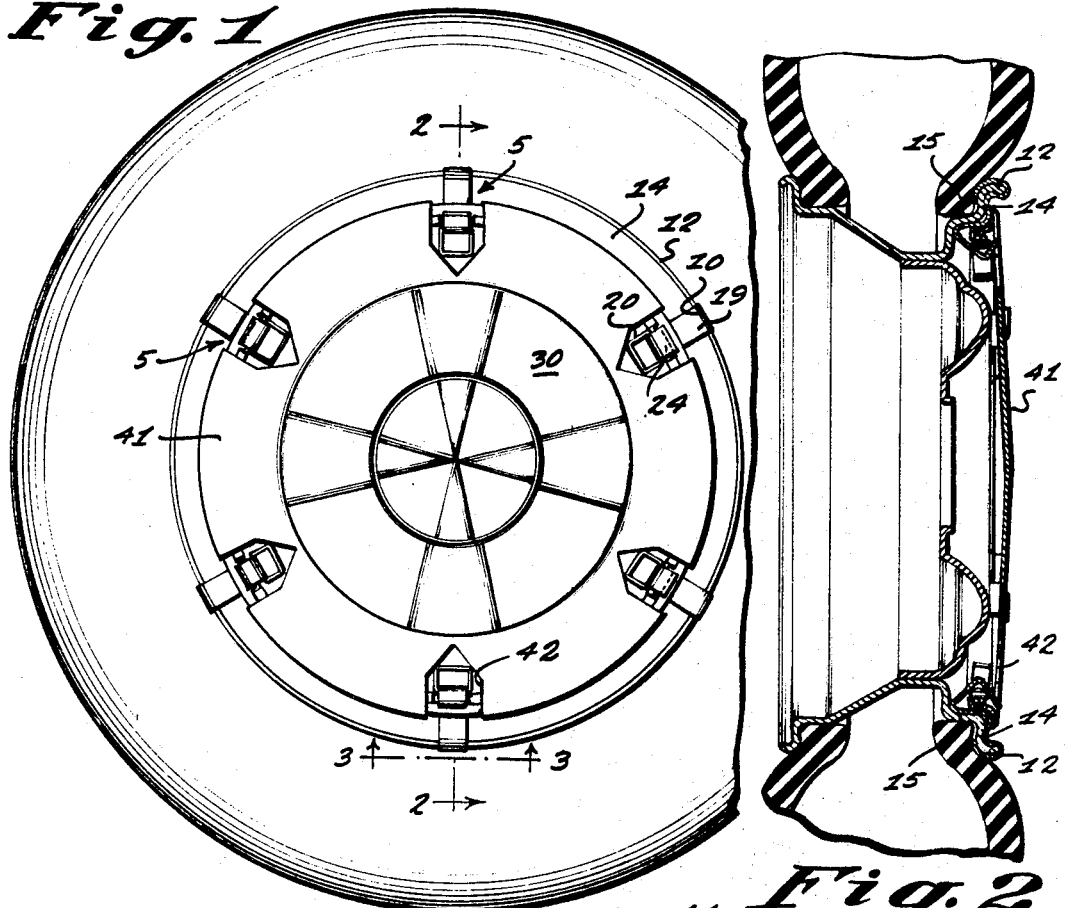
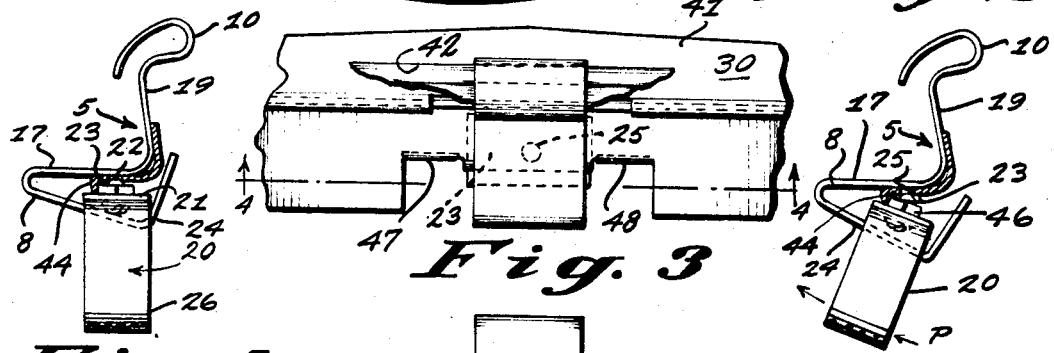
INVENTOR
JOHN HENRY BRUMFIELD
BY
Richard Hansen
ATTORNEY June 25, 1968 J. H. BRUMFIELD 3,389,937
WHEEL COVER AND RETAINING MEANS THEREFOR
Filed Aug. 8, 1966 3 Sheets-Sheet 2
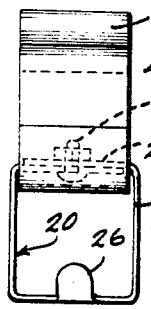
Fig. 7
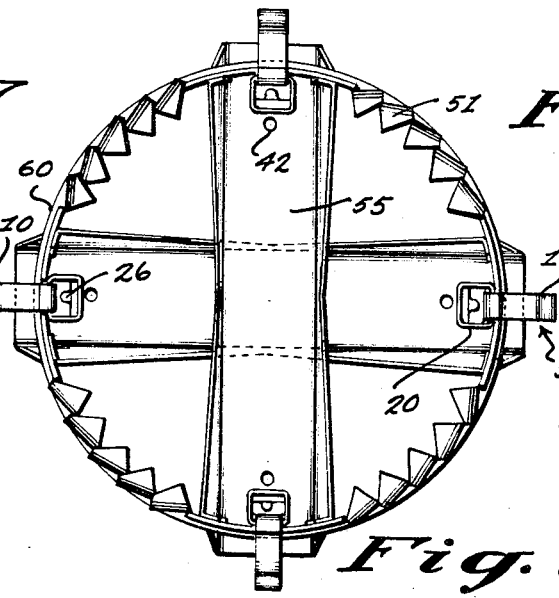
Fig. 8
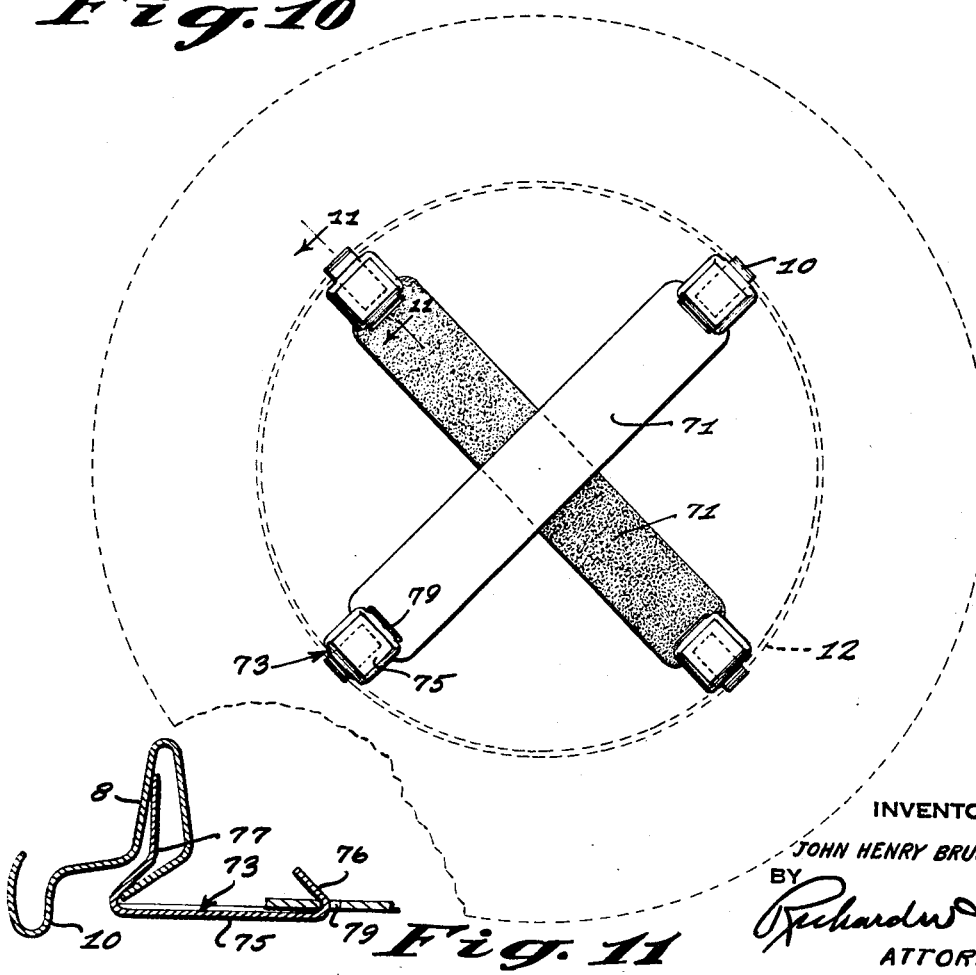
Fig. 9
Fig. 10
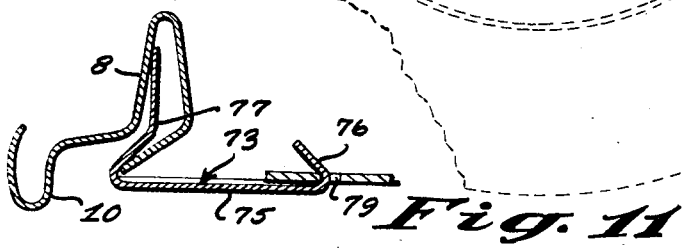
Fig. 11
INVENTOR
JOHN HENRY BRUMFIELD
BY
ATTORNEY June 25, 1968 J. H. BRUMFIELD 3,389,937
WHEEL COVER AND RETAINING MEANS THEREFOR
Filed Aug. 8, 1966 3 Sheets-Sheet 3

INVENTOR
JOHN HENRY BRUMFIELD
BY
Richard W Hansen
ATTORNEY

United States Patent Office 3,389,937
Patented June 25, 1968

3,389,937
WHEEL COVER AND RETAINING
MEANS THEREFOR
John Henry Brumfield, 3900 N. Weber,
Colorado Springs, Colo. 80907
Filed Aug. 8, 1966, Ser. No. 570,982
6 Claims. (Cl. 301—37)

ABSTRACT OF THE DISCLOSURE

A clip for detachably fastening a wheel cover to a wheel, having a V-shaped body with a partial cover thereover and in which is disposed a portion of a pivotal latch adapted to secure a flange of the wheel cover between the latch and one side of the V-shaped body.

---

The present invention relates generally to improvements in automobile wheel covers and more particularly to a means for detachably securing the wheel covers to the wheel while at the same time providing for quick and easy detachment of the cover.

There have been a large number of developments in the art of securing wheel covers to vehicle wheels and of these efforts many have been concerned with springable clips which are retained in place by sandwiching a portion of the clip between the bead of the pneumatic tire and the flange of the wheel rim on which the tire is mounted. The other portion of the clip has been fastened in various ways to the inside or edge of the wheel cover. The disadvantages and cost of these clip systems have been such, however, as to substantially discourage conversion to these systems from the older expedient of springable leaves integral with the wheel cover which edge into the inner circle of the wheel rim formed by the tire bead seat.

It is therefore the primary object of the present invention to provide a wheel cover having a retainer means which will positively lock the wheel cover onto the wheel rim but which is removable by properly applied finger pressure.

A further object of the invention is to provide a wheel cover which is not dependent on a continuous cover circumference for its fastening means.

A still further object of the invention is to provide a wheel cover having an open center area and circumferential impellar blades to propel cooling air flow to the wheel and brakes of an automobile.

Another object of the invention is to provide a retaining means for wheel covers which lends itself to great design flexibility of wheel covers, both ornamental and functional.

Other and still further objects, features and advantages of the present invention will be apparent from a reading of the following detailed descriptions of a preferred form of the invention and some modifications thereof taken in conjunction with the accompanying drawings in which:

FIGURE 1 is a fragmentary plan view of a vehicle wheel and tire having the preferred form of wheel cover attached thereto with the means of the present invention.

FIGURE 2 is a fragmentary enlarged cross-sectional view taken along lines 2—2 of FIGURE 1.

FIGURE 3 is a fragmentary side elevational view of the wheel cover of the present invention and the retaining means therefor taken along lines 3—3 of FIGURE 1.

FIGURE 4 is a fragmentary top plan view of the wheel cover and retaining means therefor.

FIGURE 5 is a side view of the preferred form of the fastening means of the present invention showing the latch in its holding position.

FIGURE 6 is a side view of the preferred form of the fastening means of the present invention showing the latch midway between the holding and cocked position.

FIGURE 7 is a top plan view of the preferred form of the fastening means.

FIGURE 8 is a bottom view of the preferred form of the fastening means.

FIGURE 9 is a plan view of a modified form of the wheel cover of the present invention having the fastening means attached thereto at four equispaced points.

FIGURE 10 is a plan view of a further modification of the wheel cover and fastening means with the vehicle wheel and tire shown in phantom.

FIGURE 11 is a cross-sectional view taken along lines 11—11 in FIGURE 10.

Briefly, the invention can be described as a retainer for securing automobile wheel covers to wheel rims which includes a V-shaped springable metal strap, having clip means for fastening the assembly to the wheel rim, and a latch which fastens insides the V-shaped portion and secures the wheel cover to the wheel.

Figures 13, 14, 15:
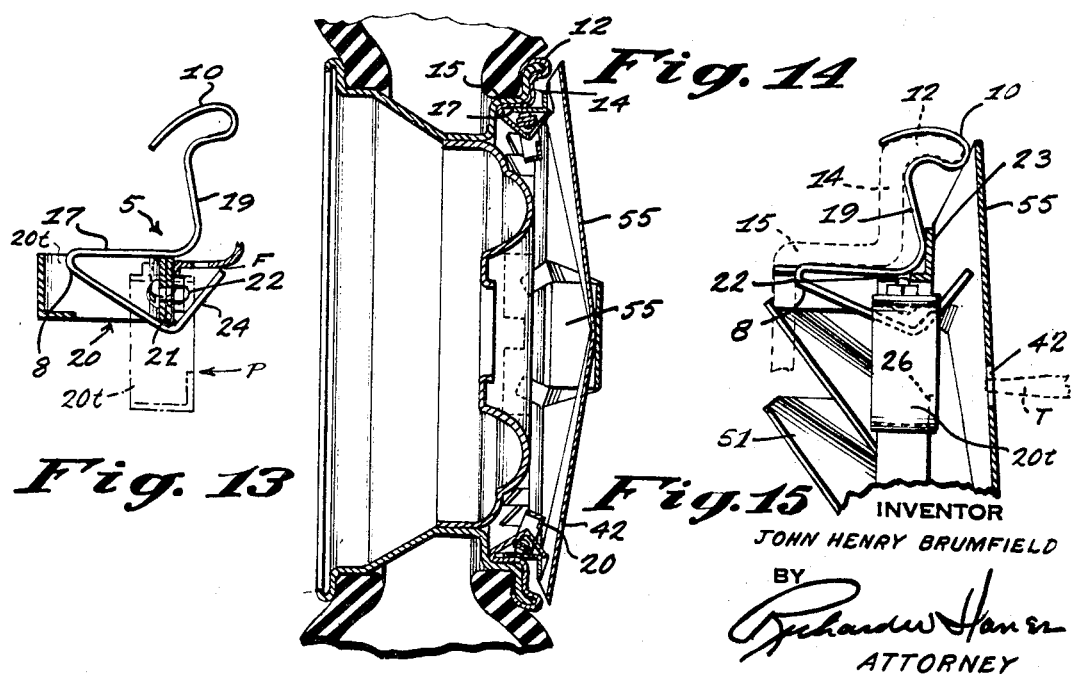
FIGURE 13 is a side view of the preferred form of the fastening means of the present invention showing the latch in the cocked position.
FIGURE 14 is a fragmentary cross-section view taken along lines 2—2 of FIGURE 12.
FIGURE 15 is an enlarged fragmentary view of the fastening means and wheel rim of the embodiment of the invention shown in FIGURE 14.

The entire mechanism of a preferred form of the fastening device 5 is shown in the views of FIGURES 5, 6 and 13. The springable metal strap which forms a V-shaped portion 8 is bent ninety degrees upwardly, thence outwardly and thence inwardly back upon itself to form a springable clip 10 which is adapted to fit snugly onto the flared lip 12 of the verticle flange 14 of a vehicle wheel rim 15. As seen in FIGURE 2, one leg 17 of the V member 8 is adapted to lie along and underneath the bottom of the tire bead seat while the ninety degree upwardly bent portion 19 of the device is designed to be disposed adjacent the flange 14.

In the preferred form there is disposed within the V-shaped retainer portion 8 of the fastener means 5 a latch 20, top and bottom views of which may be best seen in FIGURES 5 and 6 respectively. The latch 20 includes a trigger 20t integral with a flat base member 21 which mounts a pin 22 and which is disposed in the V-shaped member in such a fashion that the spring pressure of the legs of the V exert a compressive force on the pin 22 when the latch is in the position shown in FIGURE 5.

The second leg 24 of the V member 8 is extended over the open end of the V to guard against the latch 20 being pushed out of the V by the compressive force of the two legs 17 and 24. Pressure P applied to the rear side 26 of the latch 20, as shown in FIGURE 6, will result in a pivotal movement of the latch 20 to the position shown in FIGURE 13. In this latter position, which may be referred to as "cocked," the V-member is expanded by the width of the base member 21 of the latch 20 and is stable in that position until a force F is exerted which will allow the spring force of the V member 8 to pivot the latch back into the position shown in FIGURE 5.

FIGURES 1, 3 and 4 depict one design of a wheel cover structure which will cooperate with the latching mechanism described. A plurality of circumferential flanges 23 are equispaced around the periphery of the wheel cover and an aperture or detent 25 is located in the flange in a position which will provide a mating of the pin 22 of the fastening latch 20 and the said aperture when the wheel cover is properly located over the wheel.

One of the novel and significant features of the apparatus of the present invention is the simplicity with which the covers may be applied and removed. Before placing the cover over the wheel all of the fasteners are depressed into a cocked position, then with the flanges of the cover positioned over each of the fastening latches 20 as illustrated in FIGURE 13 a quick application of force with the hand at a point just over the fastener will cause the latch 20 of each fastener to flip or pivot so that the pin 22 of each latch 20 will become seated in the aperture as shown in FIGURE 5. The compressive force of the V-shaped member 8 holds the latch 20 firmly in place and secures the wheel cover to the wheel even when traversing bumpy terrain.

The wheel cover latch 20 may be released merely by the application of force, with a finger or tool T, to the rear end tab 26 of the latch 20, thus pivoting the latch 20 into the position shown in FIGURE 13 and releasing the hold on the wheel cover flange 23.

In further reference to the wheel cover 30, reference is again made to FIGURES 1, 3, and 4. In addition to the circumferential flanges 23 previously mentioned, the cover is equipped with a design or ornament bearing surface 40 attached by any convenient means to the flange 23. The number of holding flanges 23 necessary to secure a cover to the wheel is discretionary, the form shown in FIGURE 1 having six, however, fewer partners may well serve the purpose. Over each of the fastener devices an opening 42 is provided in the cover surface 40 to permit a finger or tool T to be inserted to depress the latch 20 for disengagement. The opening need not be as large as those illustrated of course, a small opening for a screwdriver shank is sufficient. In order to facilitate the pivoting to the cocked position of the latch 20 the flange 23 is provided with a seat forming bend 44 along the bottom edge of the flange. As best seen in FIGURE 6 the nut 46 threaded onto the pin 22 abuts the seat 41 and forms the pivot or hinge line for the latch 20. In addition to facilitating the pivotal action the seat 41 acts as a guard for further securing the wheel cover inasmuch as the flange 23 is prevented from slipping out of the V-member 8 with the seat beneath the nut 46.

A pair of turned in tabs 47 and 48 insure against rotation of the cover 30 with respect to the wheel in the event that the pin 22 would fail to remain seated in the aperture 25. One of the tabs, 47 or 48, upon striking the clip 5 would act to inhibit further rotation of the cover 30.

Figure 12:
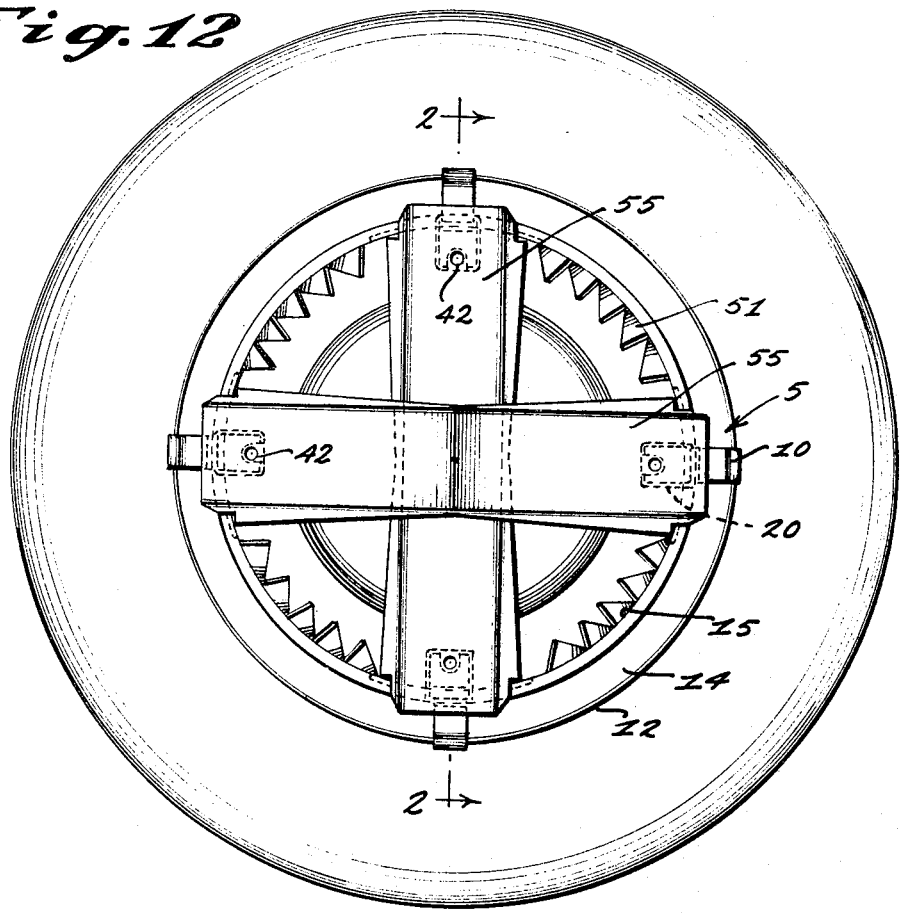
FIGURE 12 is a plan view of a vehicle wheel and tire with the wheel cover of FIGURE 9 mounted thereon.

The fact that only very limited portions of the circumference of a cover must be utilized for securing and fastening purposes encourages flexity of wheel cover design and utilization not heretofore possible. Referring to FIGURES 9, 12 and 15 there is illustrated a wheel cover having circumferential fins or blades 51 between the securing flanges which act to impel cooling air to the brakes. Heretobefore that portion of the circumference now given over to the blades was required for the wheel cover mounting means. A decorative cover means 55 is attached to the annular ring 60, however, the one shown is exemplary only. No apertures are required for access to the latch in configurations such as shown in FIGURE 1 where the latch is accessible from either side of the cover piece 55.

The fastening means of the present invention permits taking the design of FIGURE 1 one step further by eliminating the circumferential ring 60. A modification of this type is shown in FIGURE 10 where a pair of diametric, ornamental straps 71 are shown directly attached at each of their ends to the wheel rim by the clip 10 of the present invention and a modified form of the latch 73. It should be pointed out before explaining the details of the modified latch that it may be used in connection with a more conventional type wheel cover, as shown in FIGURE 1, as well as the type shown in FIGURE 10. The modified latch 73 includes a flat body portion 75 having a turned down frontal edge lip 76 and an elongated, turned down rearward edge 77 which is "dog-legged" to conform generally with the cross sectional contour of the V-member 8 of the clip means. The front edge lip 76 is adapted to fit into a lateral slot 79 in the wheel cover to provide holding tension against the force of a diametrically opposed fastener of the same description. The rear bend 77 of each latch 73 is maintained in place by the V-shaped portion 8 of the clip 10 until such time as the latch 73 is manually moved forward, or radially inwardly of the cover, against the spring pressure of the V-member 8 a sufficient distance that the forward lip 76 may be lifted out of the cover slot 79 and disengaged from the cover means 71.

Having thus described the several useful and novel features of the wheel cover and retaining means therefor of the present invention in connection with the accompanying drawings, it will be seen that the many worthwhile objectives for which is was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. Wheel cover retaining means comprising a springable generally V-shaped retainer having substantially flat sides and having one leg thereof extended back over the open end of the V;

anchor means integral with said V-member and adapted to be attached to the rim of a vehicle wheel;

movable latch means disposed within said V-member, said latch adapted to engage a vehicle wheel cover, and including:

a flat base member sized so as to be subject to compression from the legs of the V-member when disposed in a position normal to the long axis of the V-member; and a pin mounted on the flat base and perpendicular thereto, said pin being sized and positioned so that one end thereof bears against the inside of one leg of the said V-member when the base member is pivoted to a position parallel to the long axis of the V-member.

2. The combination of claim 1 and further including a trigger means attached to the flat base member to provide leverage for pivoting the latch into a cocked position.

3. A wheel cover assembly for a vehicle wheel including in combination;

a vehicle wheel having a rim cover means;

a plurality of equispaced fastener means interconnecting the rim of the wheel and the cover means, each of said fastener means including;

a springable generally V-shaped retainer member having substantially flat sides which are positioned normal to the radius of the wheel and where one leg of the V-member is extended back over the open end of the said V;

anchor means integral with said V-member and adapted to be attached to the said rim;

movable latch means disposed within said V-member, said latch adapted to engage said cover means and pivotal through an arch of approximately 90°.

4. The combination of claim 3 wherein the pivotal latch includes;

a flat base member sized so as to be subject to compression from the legs of the V-member when disposed in a position normal to the long axis of the V-member; and a pin mounted on the flat base and perpendicular thereto, said pin being sized and positioned so that one end thereof bears against the inside of one leg of the said V-member when the base member is pivoted to a position parallel to the long axis of the V-member.

5. The assembly of claim 4 wherein said cover means includes;
   a plurality of inwardly projecting flanges perpendicular with the plane of the wheel and having a central aperture adapted to receive the said pin when the flange is engaged with the latch so as to pivot the latch.

6. The combination of claim 4 and further including impeller blade means disposed circumferentially around the cover means.

References Cited

UNITED STATES PATENTS

| | | |
|---|---|---|
| 1,501,000 | 7/1924 | Lane. |
| 2,174,087 | 9/1939 | Horn. |
| 2,351,655 | 6/1944 | Aske. |
| 2,617,423 | 11/1952 | Miller. |
| 2,927,824 | 3/1960 | Simon. |

FOREIGN PATENTS

| | | |
|---|---|---|
| 1,159,444 | 2/1958 | France. |

RICHARD J. JOHNSON, *Primary Examiner.*